(12) United States Patent
Ball et al.

(10) Patent No.: US 7,290,704 B1
(45) Date of Patent: Nov. 6, 2007

(54) METHOD AND SYSTEM RELATING TO A MULTI-LATERAL TRADE ENGINE FOR PAYMENT TRANSACTIONS

(76) Inventors: Robert Ball, 1796 W. Wesley Rd., NW., Atlanta, GA (US) 30327; Daniel Friel, 5510 Providence Glen Rd., Charlotte, NC (US) 28270; Jeffrey R. Sechrest, 850 Park Ave., New York, NY (US) 10021

( * ) Notice: Subject to any disclaimer, the term of this patent is extended or adjusted under 35 U.S.C. 154(b) by 0 days.

(21) Appl. No.: 11/425,627

(22) Filed: Jun. 21, 2006

Related U.S. Application Data

(60) Provisional application No. 60/692,766, filed on Jun. 21, 2005.

(51) Int. Cl.
- *G06K 5/00* (2006.01)
- *G06F 17/00* (2006.01)
- *G06F 7/08* (2006.01)
- *G06Q 20/00* (2006.01)
- *G06Q 40/00* (2006.01)

(52) U.S. Cl. .................. 235/380; 235/375; 235/381; 235/382; 705/16; 705/17; 705/35; 705/39

(58) Field of Classification Search ............... 235/375, 235/379–382; 705/35, 39, 16, 17
See application file for complete search history.

(56) References Cited

U.S. PATENT DOCUMENTS

| | | | |
|---|---|---|---|
| 6,494,367 B1 * | 12/2002 | Zacharias | 235/382 |
| 6,732,919 B2 * | 5/2004 | Macklin et al. | 235/380 |
| 2003/0061157 A1 * | 3/2003 | Hirka et al. | 705/39 |

OTHER PUBLICATIONS

Google Checkout, https://checkout.google.com/buyer/tour.html (2 pages).
"How Google Checkout Could Threaten PayPal", Article from MIT Technology Review, Wade Roush (3 pages).
PayPal, https://www.paypal.com/us/cgi-bin/webser?cmd=xpt/cps/general/NewConsumerWorks—outside (2 pages).

\* cited by examiner

*Primary Examiner*—Daniel Stcyr
*Assistant Examiner*—April Taylor
(74) *Attorney, Agent, or Firm*—Greenberg Traurig, LLP

(57) ABSTRACT

In one embodiment of the present invention a method to allow a consumer to direct payments to be made via one or more payment vehicles of choice is provided. In another embodiment of the present invention a system to allow a consumer to direct payments to be made via one or more payment vehicles of choice is provided.

28 Claims, 5 Drawing Sheets

United States Patent US 7,290,704 B1

METHOD AND SYSTEM RELATING TO A MULTI-LATERAL TRADE ENGINE FOR PAYMENT TRANSACTIONS

CROSS-REFERENCE TO RELATED APPLICATIONS

This application claims the benefit of U.S. Provisional Application Ser. No. 60/692,766, filed Jun. 21, 2005. This provisional application is incorporated herein by reference in its entirety.

FIELD OF THE INVENTION

In one embodiment of the present invention a method to allow a consumer to direct payments to be made via one or more payment vehicles of choice is provided.

In another embodiment of the present invention a system to allow a consumer to direct payments to be made via one or more payment vehicles of choice is provided.

For the purposes of describing and claiming the present invention, the term "consumer" is intended to refer to a party purchasing or having purchased a product and/or service from a provider.

Further, for the purposes of describing and claiming the present invention, the term "payment vehicle" is intended to refer to an account or mechanism for providing funds or credit (e.g., a stored value card account (e.g., a stored value card issued by a merchant), a credit card account (e.g., issued by a credit card issuing bank or a credit card issuing merchant), a checking account (e.g., with a bank or brokerage), a savings account (e.g., with a bank or brokerage), a money market account (e.g., with a bank or brokerage), an asset management account (e.g. a transaction enabled account with a bank or brokerage), an ATM/debit account (e.g. with a bank or brokerage), other EFT accounts (e.g. with a bank or brokerage), a line of credit (e.g., provided by a credit provider), an entity which bills a consumer to provide credit or funds to another entity (e.g., a mobile telephone service provider company which bills a consumer to provide funds or credit to another merchant for the purchase of a product or service), a settlement network (e.g. Universal Air Travel Program), other CTC (consumer to consumer) accounts (e.g. a Paypal account).

Further still, for the purposes of describing and claiming the present invention, the term "rule" is intended to refer to any indicia for defining when and how a transaction to purchase a product and/or service is to be paid.

Further still, for the purposes of describing and claiming the present invention, the term "security-enabled" is intended to refer to controlled access (e.g., via one or more passwords, one or more user names, and/or one or more biometric characteristics).

BACKGROUND OF THE INVENTION

FIG. 1 illustrates an example of a traditional payment mechanism. More particularly, it is seen that when a cardholder goes into a shop and makes a purchase with a payment card (e.g., a credit card or a debit card) the process may proceed as follows: (1) the cardholder hands over the card and signs for the purchase or enters his/her personal identification number ("PIN") at the point of sale terminal; (2) authorization for the transaction is given by the card issuer bank (if the value of the transaction is above a pre-agreed floor limit); (3) transaction details of the payment are transmitted to the merchant acquiring bank; (4) clearing and settlement of the transaction is made by the payment card scheme between the merchant acquirer bank and the card issuer bank; (5) cardholder's account is debited; (6) merchant's account is credited; (7) account balance and transaction details are transmitted to the merchant; and (8) cardholder receives account statement.

In another transaction mechanism, an automated clearing house ("ACH") process of the type shown in FIG. 2 may be utilized.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Figure 1:
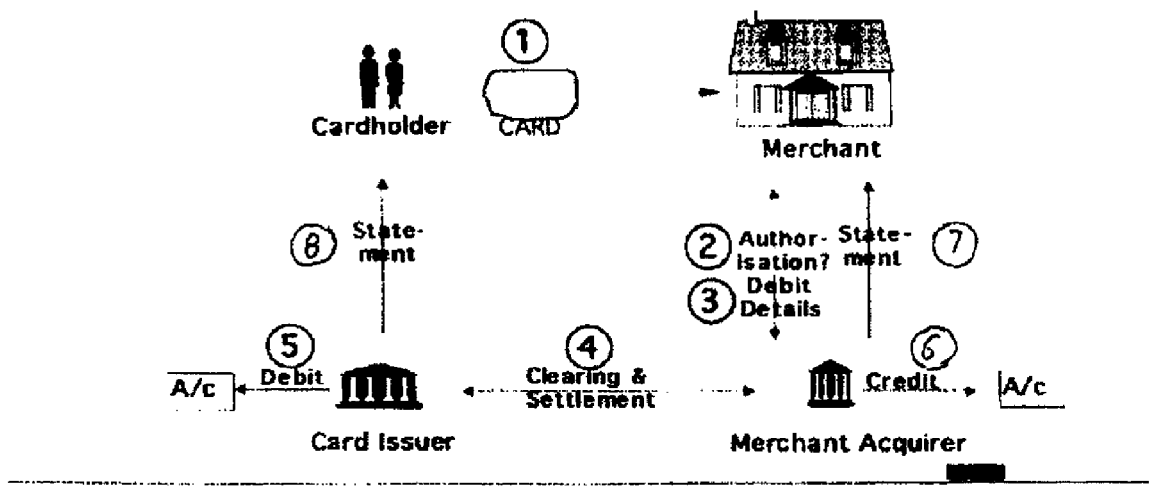
FIG. 1 shows an example of a traditional payment mechanism.
Figure 2:
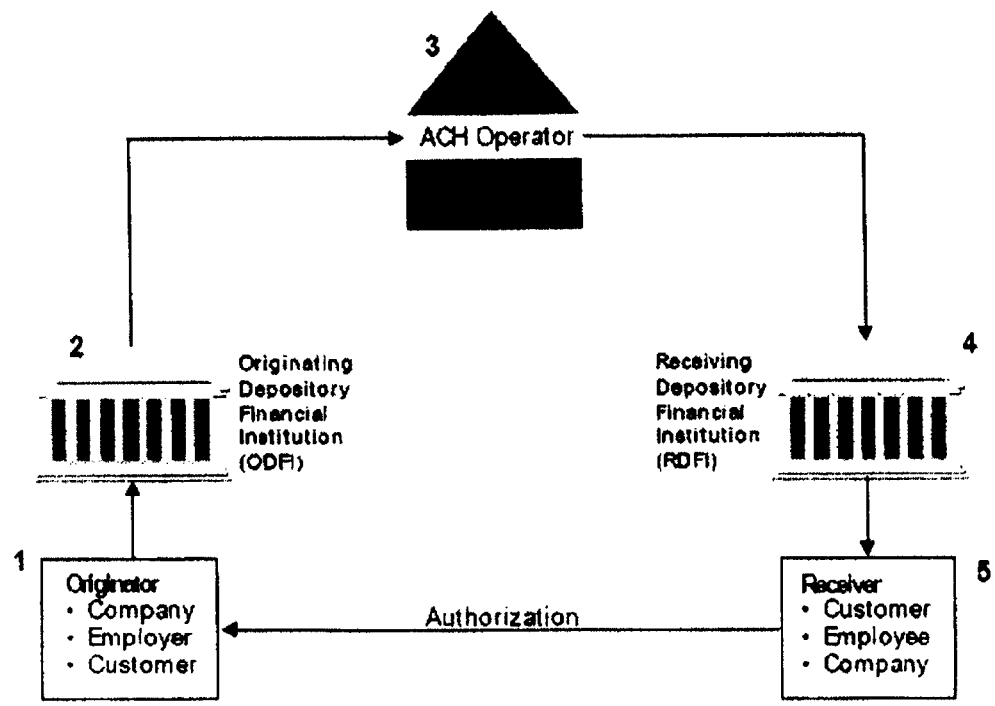
FIG. 2 shows utilization of an ACH process.
Figure 3:
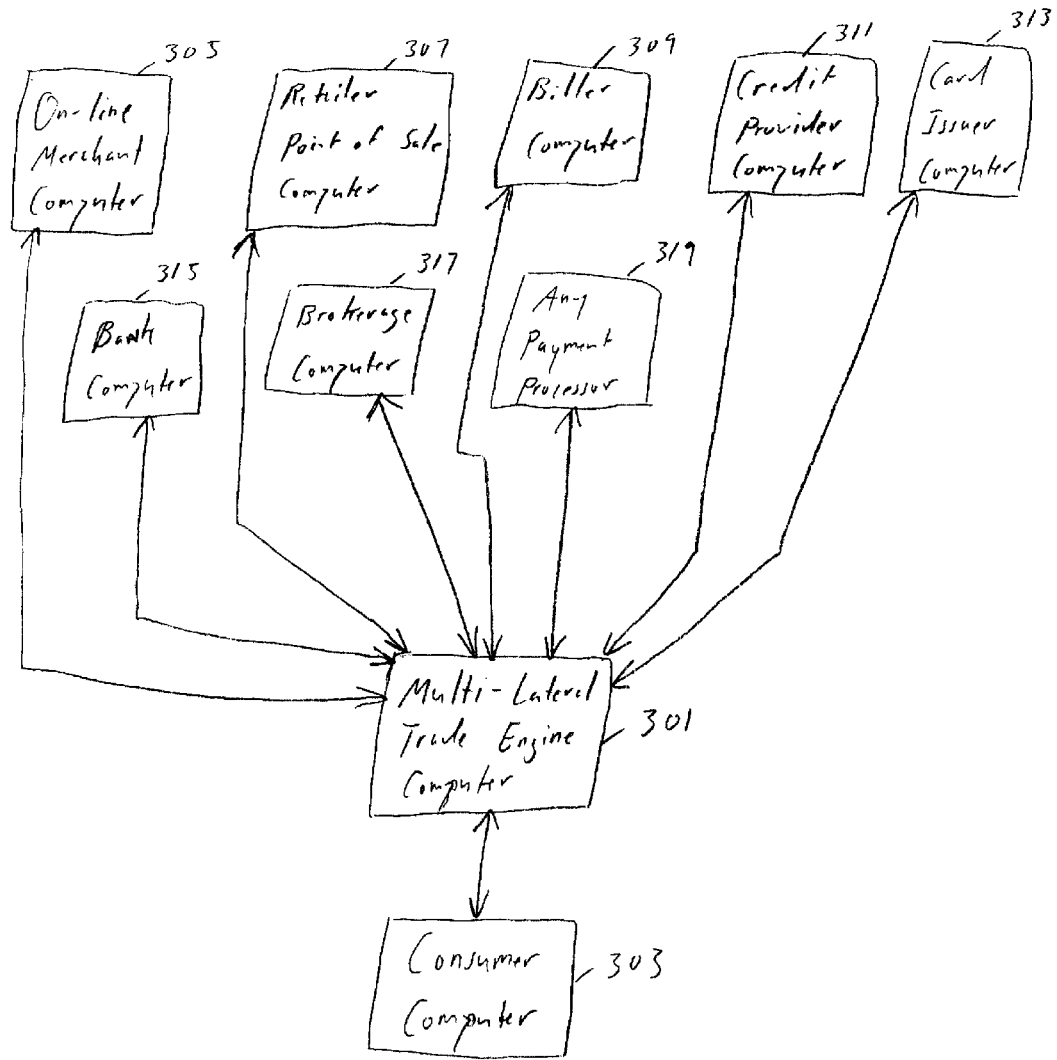
FIG. 3 shows a mechanism according to an embodiment of the present invention to allow a consumer to direct payments to be made via one or more payment vehicles of choice.

Referring now to FIG. 3, it is seen that the present invention may provide a mechanism to allow a consumer to direct payments to be made via one or more payment vehicles of choice.

More particularly, as seen in this example, a consumer may interact with Multi-Lateral Trade Engine Computer 301 via Consumer Computer 303 (this interaction may be carried out via the Internet and/or any other desired communication channel; for example, Consumer Computer 303 may include thereon a web browser for interacting with a website associated with Multi-Lateral Trade Engine Computer 301). Further, in this example Multi-Lateral Trade Engine Computer 301 may interact (e.g., via the Internet and/or any other desired communication channel) with one or more of On-line Merchant Computer 305, Retailer Point Of Sale Computer 307, Biller Computer 309, Credit Provider Computer 311, Card Issuer Computer 313 (e.g. credit card issuer, debit card issuer, pre-paid stored value card issuer), Bank Computer 315, Brokerage Computer 317 and/or Any Payment Processor 319 to pay for transaction(s) as instructed by the consumer according to payment rules (discussed in more detail below) given to Multi-Lateral Trade Engine Computer 301 by the consumer.

As such, the present invention may optimize the payment (e.g. minimize the transaction cost and/or minimize the transaction time) based on one or more consumer rules (for example (which example is intended to be illustrative and not restrictive), the consumer may under the present invention set-up numerous options for payment of multiple transactions via multiple payment vehicles depending on specified rules).

Figure 4:
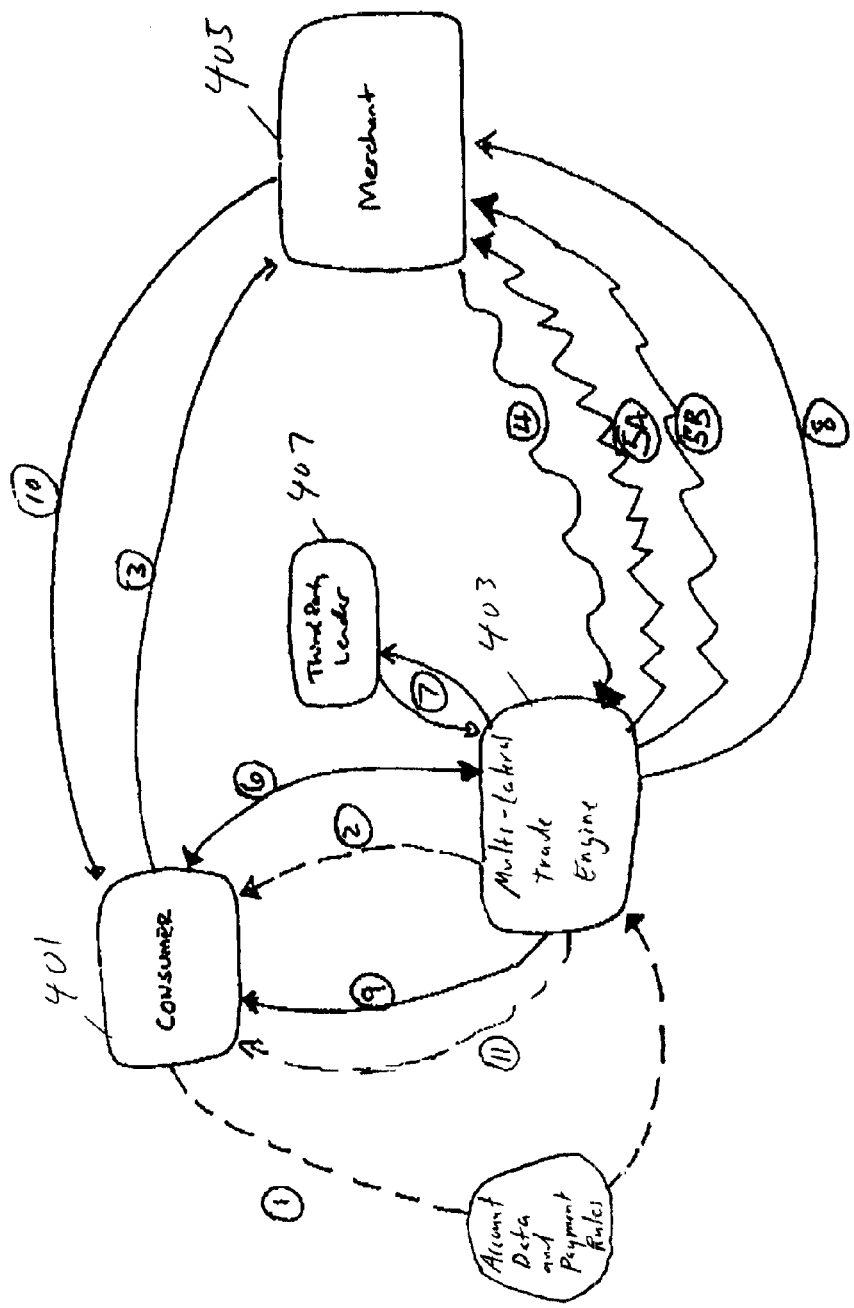
FIG. 4 shows how a multi-lateral approach with rules may be implemented according to an embodiment of the present invention.

With reference now more particularly to the rules mentioned above, attention is directed to FIG. 4, showing an example of how this multi-lateral approach with rules may be implemented (the arrows are numbered to correspond to the steps described below).

More particularly, in step 1 of this example Consumer 401 inputs data (e.g., information concerning his or her: bank/brokerage/merchant credit cards, bank/brokerage debit cards, checking/savings/money market accounts, pre-paid stored value card accounts, established credit lines) and sets rules for use in a corresponding account associated with Multi-Lateral Trade Engine 403 (in one example, such rules may be input via an on-line screen with questions that are populated by Consumer 401). In step 2, Multi-Lateral Trade Engine 403 approves and activates one or more accounts of Consumer 401. In step 3, Consumer 401 shops at Merchant 405 (e.g., shops at a website of Merchant 405), chooses an item to purchase and requests to purchase the item from Merchant 405 (in this example, Consumer 401 designates his/her Multi-Lateral Trade Engine account as the method of payment in the checkout stage at the website of Merchant 405). In step 4, Merchant 405 seeks payment authorization from Multi-Lateral Trade Engine 403. In step 5, two different scenarios are illustrated: step 5A is when Multi-Lateral Trade Engine 403 approves the transaction as within the set rules and then goes to step 8; or step 5B is when Multi-Lateral Trade Engine 403 authorizes pending an outcome in step 6. In step 6, Multi-Lateral Trade Engine 403 notifies Consumer 401 that the transaction is above the defined limits set in step 1 and confirms an intention to seek an extension of credit. In Step 7, Multi-Lateral Trade Engine 403 seeks and obtains credit form Third Party Lender 407 (although only one lender is shown, any number of lenders may be queried for credit and/or used for credit). In Step 8, Multi-Lateral Trade Engine 403 authorizes the transaction. In Step 9, Multi-Lateral Trade Engine 403 notifies Consumer 401 of transaction with Merchant 405, confirms default payment mechanism (e.g. pre-defined rules), potentially offers additional or alternative payment options (e.g. based on previous history and/or current credit/debit marketplace conditions) and/or other offers (e.g. warranties/insurance products). In Step 10, Merchant 405 ships product (or delivers service). In Step 11, based on payment chosen, merchant chosen and/or product/service, Multi-Lateral Trade Engine 403 offers periodic and/or real time reporting, cross-selling opportunities and payment plans update (e.g. switching from one line of credit to another based on interest rates). Of course, in an additional step (not shown) Multi-Lateral Trade Engine 403 carries out any necessary processing (e.g., funds transfer) with the merchant and the various payment vehicles as instructed by the rules.

Of note, the steps may be carried out in an order other than as described above. Further, not all steps must be carried out for each transaction (e.g., once data is input in step 1, a number of transactions may be made using the same input data/rules).

Figure 5:
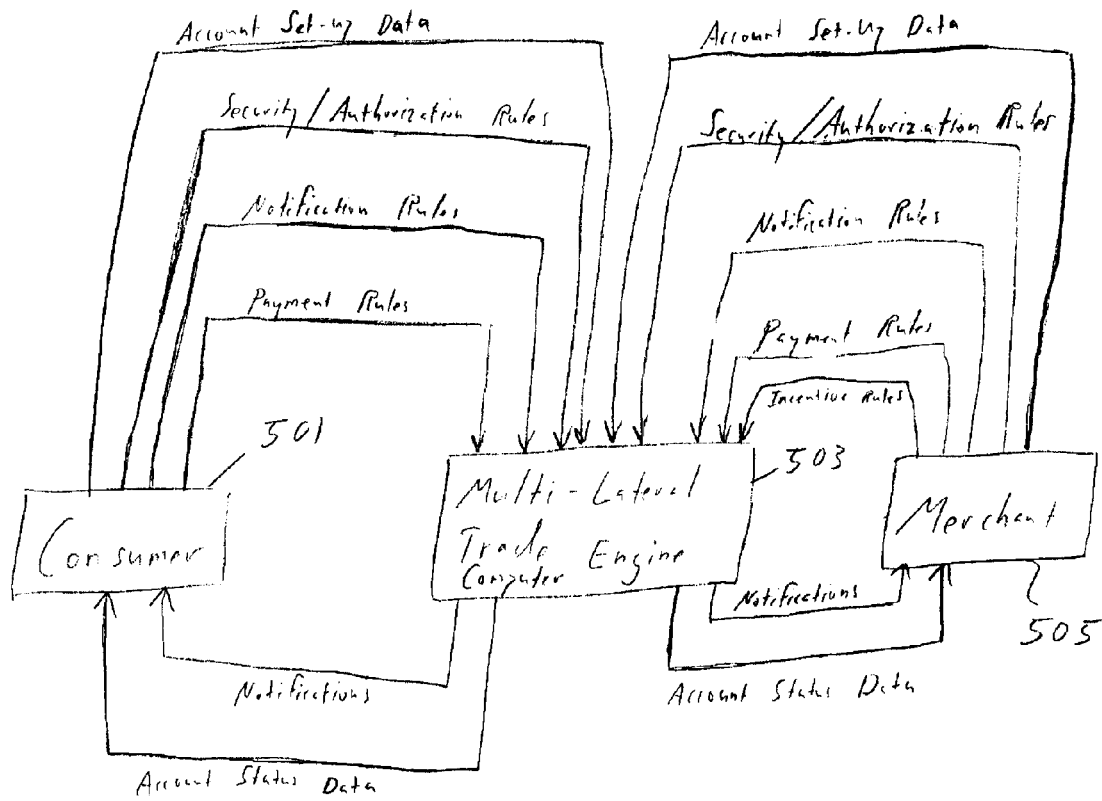
FIG. 5 shows another view of how a multi-lateral approach with rules may be implemented according to an embodiment of the present invention.

Referring now to FIG. 5, another view of how a multi-lateral approach with rules may be implemented according to an embodiment of the present invention is shown. More particularly, it is seen in this example that Consumer 501 communicates with Multi-Lateral Trade Engine Computer 503 (e.g., via a web-browser/web server configuration) to provide various rules to Multi-Lateral Trade Engine Computer 503 (e.g., rules relating to how payments are to be made from various payment vehicles to various merchants for various transactions; rules relating to how notifications are to be made regarding various payment vehicles, various merchants and various transactions; rules relating to security/authorizations). Further, it is seen that Multi-Lateral Trade Engine Computer 503 may communicate with Consumer 501 to provide various notifications and/or account status data. Moreover, it is seen that Merchant 505 communicates with Multi-Lateral Trade Engine Computer 503 (e.g., via a web-browser/web server configuration) to maintain a relationship (e.g., under a "merchant agreement") between Merchant 505 and a transaction facilitator running Multi-Lateral Trade Engine Computer 503 (the maintenance may include, but not be limited to, setting various payment rules, notification rules, security/authorization rules, incentive rules and/or determining account status).

With reference once again to the rules mentioned above, the following are a number of examples of such rules (of course, the following examples are intended to be illustrative and not restrictive):

for bills use checking account; for commerce below $10 use stored value card account; for commerce above $10 and below $200 use checking account; for commerce above $200 use credit card A, if in excess of available then credit apply for/utilize additional credit for a transaction amount below $X, use credit card A; for a transaction amount above $X, use credit card Y for the first 5 days of the month (coinciding with a certain billing cycle), use credit card A otherwise use debit card B for merchant A, when it is running a special offer, use merchant A credit card for merchant B, use checking account to get discount for mileage awards in airline A, use credit card D until 100,000 miles are achieved then use credit card E for rebate points to electronic store A for a transaction amount below $X, use checking account; for a transaction amount above $X, get and use an "instant" line of credit (provided by one or more credit providers)

for airline tickets, use checking account; otherwise use credit card A for gas, use credit card A; otherwise use credit card B all micro-payments (e.g., less than $0.10) are to be paid from one or more pre-paid stored value card accounts for purchases above $X notify the consumer via email, for purchases below $X notify the consumer via text message (notifications may be, for example, for security verification, to know when certain purchases are made and/or to provide real-time balance information)

In another example, consumer rules may control transaction payments by amount, by type of merchant/product (e.g. exclude "adult" sites) and/or by sub-account.

In another example, consumer rules may be set pre-purchase (i.e., at a time before the purchase), at purchase/checkout, and/or post-purchase/transaction (i.e., at a later time).

In another example, account modification/maintenance may be carried out in real-time, via periodic reporting, via monthly/quarterly/annual reporting, and/or via one or more alerts/notifications.

In another example, cross-sell and up-sell offers from participating merchants/retailers/billers may be made to the consumer in a periodic and/or real-time manner.

As discussed above, various embodiments of the present invention may be designed to put customers in control of their payment transactions. For example, the present invention may employ a multi-lateral approach by using multiple payment schemes (e.g. one or more of each of the following: credit cards, checks, ACH, offline debit, online debit and/or EBT). In another example, the present invention provides a customer/merchant/retailer/biller friendly model for completing payment transactions.

It is to be understood, of course, that the present invention may be employed "on-line" (e.g. via the Internet) and/or in the "brick-and mortar" environment. In this regard, the present invention may leverage the ubiquity of a worldwide IP enabled network to streamline and reduce the cost of payment transactions (the present invention may be configured to operate on any desired electronic network(s)).

In another embodiment, the present invention may utilize the role that IP connectivity plays and leverage the "real time" capabilities inherent in an IP network to enhance consumers' payment choices, increase consumers' confidence in electronic payments, and give consumers essentially instant access to their information (of course, the present invention can offer connectivity over any desired network, wired and/or wireless).

Reference will now be made to a number of examples (which examples are intended to be illustrative and not restrictive) of various capabilities that the present invention may provide for the consumer and/or merchants/billers.

In this regard, the present invention may put consumers in charge of their payments and draw upon "best of breed" providers to create a powerful bundle of benefits including "choice" (e.g., letting the consumer decide), "confidence" (e.g., enhanced security features), and "convenience" (e.g., giving the consumer the ability to track all of their payment activities in real time; providing special member benefits).

More particularly, the benefit of "choice" may include (but not be limited to): (1) consumers may use the present invention for all of their transactions—e.g., to execute all of their e-commerce purchases of goods/services, as well as pay their bills online, all from a single "place" using the payments vehicle(s) of their choosing; (2) in addition to payments, in another embodiment, a person utilizing the present invention may have an "instant credit line" from their bank or other otherwise unrelated financial institution that can be drawn down in a fashion similar to a credit card—thus, consumers can choose their desired form of payment Further, the benefit of "confidence" may include (but not be limited to): (1) consumers may be given the opportunity to leverage the enhanced security features available with the multi-lateral trade engine according to various embodiments of the present invention; (2) the multi-lateral trade engine according to various embodiments of the present invention may leverage the fraud detection capabilities one or more major bill payment/presentment providers and/or leading online retailers (each of which typically has highly sophisticated fraud detection capabilities) to institute a tightly integrated "closed loop" customer system—in this regard, the more a consumer uses the system, the better the fraud detection system becomes due to better data on past consumer transactions and behavior patterns; (3) the multi-lateral trade engine according to various embodiments of the present invention may help to insure against other online consumer security issues (e.g. ID theft)—in this regard, just as the consumer chooses payment options, the consumer may also be allowed to choose the appropriate level of security for a given transaction (e.g. for small dollar "micro-payments" no or limited consumer authentication may be required, for a substantial dollar draw down on a Line of Credit both an account number and password and a special text messaged key may all be required (again, based on the consumer's preferences); (4) various embodiments of the present invention may be able to absorb most if not all of the fraud risk to merchants in exchange for the payment of a "fraud protection fee" (in one example, such fee may be less than the loss percentage currently suffered by online merchants forced to bear such risk by traditional credit card associations)—of note, the more a consumer utilizes the multi-lateral trade engine, the more the risk of fraud is reduced and the decreased risk of fraud can be passed along to the merchant; (5) a multi-lateral trade engine may pool shared fraud information and add a layer of "insurance" for merchants—in this regard, fraud information may be pooled by the multi-lateral trade engine and may be shared between merchants providing relevant information gleaned from a wider transaction base.

Further still, the benefit to the consumer of "convenience" may include (but not be limited to): (1) a multi-lateral trade engine according to various embodiments of the present invention may provide users with real-time access to dynamically updated account information, with easy to use payment and tracking tools for all bills and online purchases (e.g., allowing the consumer complete, integrated control of his/her online financial transactions); (2) a multi-lateral trade engine according to various embodiments of the present invention may provide users exclusive or advanced access to premier offerings on goods, services, and special events, and discounts and/or free shipping on selected purchases, and other loyalty and reward programs; (3) a multi-lateral trade engine according to various embodiments of the present invention may provide a rewards program to offer frequent flyer miles and/or other rewards for every payment and purchase made with the account; (4) a multi-lateral trade engine according to various embodiments of the present invention may provide a rewards optimization capability that e.g. maximizes flyer miles on a particular airline; (5) a multi-lateral trade engine according to various embodiments of the present invention may provide users to ability to insure or extend warranties on their purchases on selected items for nominal fees; (6) a multi-lateral trade engine according to various embodiments of the present invention may provide a recommendation engine based on expressed preferences and/or prior transactions; (7) a multi-lateral trade engine according to various embodiments of the present invention may provide security, authentication, and notification systems that enhance both consumer and merchant trust.

In another embodiment, a multi-lateral trade engine according to the present invention may be applied to the merchant community with results that may include one or more of the following: lower transaction costs and the ability to reduce the risk of fraud to the merchant; a cross-sell and up-sell "engine" may enhance merchant's (including retailers and billers) revenues; and/or fraud detection and risk management capabilities may further reduce merchant costs.

In another embodiment of the present invention, a multi-lateral trade engine may provide customer service such as: (1) value-added payments capabilities for customers—just as package "tracking" greatly enhanced customer satisfaction in the supply chain, payments "tracking" and reporting may also increase customer satisfaction; (2) cross-sell and up-sell opportunities may be enhanced at the "point of payment".

In another embodiment of the present invention, a multi-lateral trade engine may provide cost benefits such as: (1) utilization of low cost payment networks; (2) least cost routing optimization for payment processing; (3) potential low-cost transaction processing structure may enable the multi-lateral trade engine to be used for micro payment transactions.

In another embodiment of the present invention, various communications may be made to the consumer via one or more statements (e.g., periodic account balance statements) and/or one or more payment option update requests (e.g., a consumer may be notified within 24 hours after making a purchase that the default rules may be changed and that one or more transactions may be paid for in a manner as indicated "on-the-fly" by the consumer (as opposed to as indicated by the pre-defined rules). Of course, such communications may be made electronically (e.g., via email) or in a non-electronic manner (e.g., via mail or via telephone).

In another embodiment of the present invention, consumer benefits may include (but not be limited to): one or more rebates (such rebates may be based upon the use of multiple payment vehicles—for example, use of a certain credit card may qualify a consumer for a rebate associated with an otherwise unrelated credit card); one or more extended warranties/insurance plans (such extended warranties/insurance plans may be based upon the use of multiple payment vehicles—for example, use of a certain credit card may qualify a consumer for an extended warranty/insurance plan associated with an otherwise unrelated transaction); frequent flier miles (such frequent flier miles may be based upon the use of multiple payment vehicles—for example, use of a certain credit card may qualify a consumer for frequent flier miles associated with an otherwise unrelated airline).

In another embodiment of the present invention, an incentive may be provided to use micro-payments (e.g., payments less than about $0.10). For example, merchants may give special benefits or incentives (e.g., extra items and/or discounted items) to consumers who use ACH micro-payments for certain purchases (the merchant may have the option of having one or more specific payment vehicles (e.g., ACH micro-payments) presented to the consumer)

As mentioned herein, the present invention may be utilized in the context of any desired payment network(s). Specific examples (which examples are intended to be illustrative and not restrictive), include the following: check (POS—with or without truncation); check (lockbox—bank as processor or nonbank as processor); ACH; credit and offline debit (card present—VISA/MASTERCARD networks); credit and offline debit (card present—FIRST DATA networks); credit and offline debit (card not present); online debit; retail wire services; check conversion (POS-ACH); check conversion (POS-EFT); check conversion (POS-VISA (in network)); check conversion (POS-VISA (out of network)); check conversion (lockbox—bank as processor); check conversion (lockbox—nonbank as processor); EBPP (biller direct); EBPP (consolidator); EBPP (lockbox); EIPP (consolidator); P2P (PAYPAL—sending); P2P (PAYPAL—receiving); WESTERN UNION MONEY ZAP; stored value single purpose (sale); stored value single purpose (redemption); stored value multipurpose (ACH infrastructure/EBT); stored value multipurpose (credit card infrastructure/VISA BUXX); stored value multipurpose (credit card infrastructure/payroll card); contactless payment device(s); and/or employee payroll deduction.

Of note, the present invention may, of course, be implemented using any appropriate computer hardware and/or computer software. In this regard, those of ordinary skill in the art are well versed in the type of computer hardware that may be used (e.g., mainframe(s), mini-computer(s), server(s), personal computer(s), mobile computing device(s) (e.g., telephones, PDA's) one or more networks (e.g., an intranet and/or the Internet)), the type of computer programming techniques that may be used (e.g., object oriented programming), and the type of computer programming languages that may be used (e.g., (C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods have been described herein as being "computer implemented". In this regard it is noted that while such methods can be implemented using a computer, the methods do not necessarily have to be implemented using a computer. Also, to the extent that such methods are implemented using a computer, not every step must necessarily be implemented using a computer. Further, while the present invention has been described primarily in the context of a consumer making one or more payments for one or more transactions, any other desired entity (e.g., a business) may utilize the present invention to make one or more payments to any desired entity or entities. Further, funds and/or credit may be transferred via an ACH communication or via any other desired electronic funds transfer ("EFT") communication. Further still, a pre-paid stored value card issued by merchant A may be used to pay for a transaction with an otherwise unrelated merchant B. Further still, the present invention may be applied in the context of on-line bill payment. Further still, the present invention may be utilized with fixed and/or mobile devices. Further still, the present invention may be applied in the context of one or more consumers, one or more merchants, and/or one or more payment vehicles. Further still, the consumer account managed by the transaction facilitator may be fully or partial funded via pre-payment. Further still, the present invention may be utilized in person at a point of sale terminal using a card, biometric characteristic and/or other indicia. Further still, the rules may include (but not be limited to): payment rules; notification rules (e.g., notification of purchases/payments/balances to consumer(s) and/or merchant(s)); security rules (e.g., sign-on and/or authorization rules). Further still, payments may be made (and rules may apply) on a transaction by transaction basis and/or on a basis encompassing multiple transactions. Further still, various information/data may be input by one or more consumers, one or more merchants, one or more payment vehicle account providers, one or more transaction facilitators and/or one or more third-party data provides (e.g., credit bureaus). Further still, any steps described herein may be carried out in any desired order (and any steps may be added and/or deleted).

What is claimed is:

1. A computer implemented method for processing a transaction, comprising:
   setting up with a transaction facilitator at least one security-enabled consumer account associated with a consumer;
   associating, with the security-enabled account of the consumer, at least one rule related to a first payment vehicle of the consumer, wherein the first payment vehicle is associated with a first payment vehicle account provider and wherein the rule associated with the first payment vehicle identifies at least one circumstance under which the first payment vehicle is to be utilized;
   associating, with the security-enabled account of the consumer, at least one rule related to a second payment vehicle of the consumer, wherein the second payment vehicle is associated with a second payment vehicle account provider and wherein the rule associated with the second payment vehicle identifies at least one circumstance under which the second payment vehicle is to be utilized;
   associating, with the security-enabled account of the consumer, transaction information relating to at least one transaction between the consumer and a provider of a product or service; and
   directing payment for the transaction using finds from at least one of the first and second payment vehicles, wherein the transaction facilitator directs the payment and the funds are utilized in conformance with the rules and transaction information associated with the security-enabled account of the consumer;
   wherein the transaction facilitator, the first payment vehicle account provider and the second payment vehicle account provider are distinct entities;
   wherein the funds to pay for the transaction go from a respective one of the first and second payment vehicles to the provider of the product or service without being held by or credited to the transaction facilitator;
   wherein the circumstance under which the first payment vehicle is to be utilized is selected from the group consisting of: a value of the transaction being below a certain amount; a value of the transaction being above a certain amount, a certain type of product being associated with the transaction, and a certain type of service being associated with the transaction; and
   wherein the circumstance under which the second payment vehicle is to be utilized is selected from the group consisting of: a value of the transaction being below a certain amount; a value of the transaction being above a certain amount, a certain type of product being associated with the transaction, and a certain type of service being associated with the transaction.

2. The method of claim 1, wherein the first payment vehicle account provider is a financial institution.

3. The method of claim 1, wherein the second payment vehicle account provider is a financial institution.

4. The method of claim 1, wherein each of the first payment vehicle and second payment vehicle is selected from the group consisting of: (a) a credit card account; (b) a line of credit; (c) a bank account; (d) a brokerage account; and (e) a pre-paid stored value card account.

5. The method of claim 4, wherein the bank account is selected from the group consisting of: (a) a checking account; (b) a savings account; and (c) a money market account.

6. The method of claim 4, wherein the brokerage account is selected from the group consisting of: (a) a checking account; (b) a savings account; and (c) a money market account.

7. The method of claim 1, wherein the transaction is an on-line transaction.

8. The method of claim 1, wherein the transaction is carried out in person at a point of sale terminal.

9. The method of claim 1, wherein the rule associated with the first payment vehicle causes the transaction to be paid for with funds coming exclusively from the first payment vehicle.

10. The method of claim 1, wherein the rule associated with the second payment vehicle causes the transaction to be paid for with funds coming exclusively from the second payment vehicle.

11. The method of claim 1, wherein the rule associated with the first payment vehicle causes the transaction to be paid for in part with funds coming from the first payment vehicle and the rule associated with the second payment vehicle causes the transaction to be paid for in part with funds coming from the second payment vehicle.

12. The method of claim 1, wherein the transaction information relating to the transaction is received from the consumer.

13. The method of claim 1, wherein the transaction information relating to the transaction is received from the merchant.

14. The method of claim 1, wherein the steps are carried out in the order recited.

15. A system for processing a transaction, comprising:
   a mechanism that sets up with a transaction facilitator at least one security-enabled consumer account associated with a consumer;
   a mechanism that associates, with the security-enabled account of the consumer, at least one rule related to a first payment vehicle of the consumer, wherein the first payment vehicle is associated with a first payment vehicle account provider and wherein the rule associated with the first payment vehicle identifies at least one circumstance under which the first payment vehicle is to be utilized;
   a mechanism that associates, with the security-enabled account of the consumer, at least one rule related to a second payment vehicle of the consumer, wherein the second payment vehicle is associated with a second payment vehicle account provider and wherein the rule associated with the second payment vehicle identifies at least one circumstance under which the second payment vehicle is to be utilized;
   a mechanism that associates, with the security-enabled account of the consumer, transaction information relating to at least one transaction between the consumer and a provider of a product or service; and
   a mechanism that directs payment for the transaction using funds from at least one of the first and second payment vehicles, wherein the transaction facilitator directs the payment and the funds are utilized in conformance with the rules and transaction information associated with the security-enabled account of the consumer;
   wherein the transaction facilitator, the first payment vehicle account provider and the second payment vehicle account provider are distinct entities;
   wherein the funds to pay for the transaction go from a respective one of the first and second payment vehicles to the provider of the product or service without being held by or credited to the transaction facilitator;

wherein the circumstance under which the first payment vehicle is to be utilized is selected from the group consisting of: a value of the transaction being below a certain amount; a value of the transaction being above a certain amount, a certain type of product being associated with the transaction, and a certain type of service being associated with the transaction; and wherein the circumstance under which the second payment vehicle is to be utilized is selected from the group consisting of: a value of the transaction being below a certain amount; a value of the transaction being above a certain amount, a certain type of product being associated with the transaction, and a certain type of service being associated with the transaction.

16. The system of claim 15, wherein the first payment vehicle account provider is a financial institution.

17. The system of claim 15, wherein the second payment vehicle account provider is a financial institution.

18. The system of claim 15, wherein each of the first payment vehicle and second payment vehicle is selected from the group consisting of: (a) a credit card account; (b) a line of credit; (c) a bank account; (d) a brokerage account; and (e) a pre-paid stored value card account.

19. The system of claim 18, wherein the bank account is selected from the group consisting of: (a) a checking account; (b) a savings account; and (c) a money market account.

20. The system of claim 18, wherein the brokerage account is selected from the group consisting of: (a) a checking account; (b) a savings account; and (c) a money market account.

21. The system of claim 15, wherein the transaction is an on-line transaction.

22. The system of claim 15, wherein the transaction is carried out in person at a point of sale terminal.

23. The system of claim 15, wherein the rule associated with the first payment vehicle causes the transaction to be paid for with funds coming exclusively from the first payment vehicle.

24. The system of claim 15, wherein the rule associated with the second payment vehicle causes the transaction to be paid for with funds coming exclusively from the second payment vehicle.

25. The system of claim 15, wherein the rule associated with the first payment vehicle causes the transaction to be paid for in part with funds coming from the first payment vehicle and the rule associated with the second payment vehicle causes the transaction to be paid for in part with funds coming from the second payment vehicle.

26. The system of claim 15, wherein the transaction information relating to the transaction is received from the consumer.

27. The system of claim 15, wherein the transaction information relating to the transaction is received from the merchant.

28. The system of claim 15, wherein:

the mechanism that sets up with a transaction facilitator at least one security-enabled consumer account associated with a consumer comprises at least one of computer hardware and computer software;

the mechanism that associates, with the security-enabled account of the consumer, at least one rule related to a first payment vehicle of the consumer comprises at least one of computer hardware and computer software;

the mechanism that associates, with the security-enabled account of the consumer, at least one rule related to a second payment vehicle of the consumer comprises at least one of computer hardware and computer software;

the mechanism that associates, with the security-enabled account of the consumer, transaction information relating to at least one transaction between the consumer and a provider of a product or service comprises at least one of computer hardware and computer software; and the mechanism that directs payment for the transaction comprises at least one of computer hardware and computer software.

* * * * *